United States Patent [19]

Vasilow et al.

[11] Patent Number: 5,342,704
[45] Date of Patent: Aug. 30, 1994

[54] METHOD OF MAKING AN AIR ELECTRODE MATERIAL HAVING CONTROLLED SINTERABILITY

[75] Inventors: Theodore R. Vasilow, Penn Township, Westmoreland County; Lewis J. H. Kuo, Monroeville; Roswell J. Ruka, Churchill Boro, all of Pa.

[73] Assignee: Westinghouse Electric Corporation, Pittsburgh, Pa.

[21] Appl. No.: 161,218

[22] Filed: Dec. 2, 1993

Related U.S. Application Data

[63] Continuation of Ser. No. 875,860, Apr. 29, 1992, abandoned.

[51] Int. Cl.$^5$ .............................................. H01M 8/10
[52] U.S. Cl. ........................................ 429/31; 429/33; 252/182.1
[58] Field of Search .................... 429/31–33; 252/182.1

[56] References Cited

U.S. PATENT DOCUMENTS

| | | | |
|---|---|---|---|
| 4,395,468 | 6/1983 | Isenberg | 429/31 |
| 4,562,124 | 12/1985 | Ruka | 429/30 |
| 4,751,152 | 6/1988 | Zymboly | 429/31 |
| 5,106,706 | 4/1992 | Singh et al. | 429/40 X |

*Primary Examiner*—John S. Maples
*Attorney, Agent, or Firm*—Daniel P. Cillo

[57] ABSTRACT

A tubular, porous ceramic electrode structure (3) is made from the sintered admixture of doped lanthanum manganite and an additive containing cerium where a solid electrolyte (4), substantially surrounds the air electrode, and a porous outer fuel electrode (7) substantially surrounds the electrolyte, to form a fuel cell (1).

8 Claims, 1 Drawing Sheet

METHOD OF MAKING AN AIR ELECTRODE MATERIAL HAVING CONTROLLED SINTERABILITY

GOVERNMENT CONTRACT

The Government of the United States of America has rights in this invention pursuant to Cooperative Agreement DE-FC21-91MC28055, awarded by the U.S. Department of Energy.

This application is a continuation of application Ser. No. 07/875,860, filed Apr. 29, 1992, now abandoned.

BACKGROUND OF THE INVENTION

High temperature, solid oxide electrolyte fuel cell configurations are well known in the art, and are taught in U.S. Pat. No. 4,395,468 (Isenberg). The air electrode of the fuel cell can be comprised of doped or undoped oxides or mixtures of oxides in the Perovskite family, such as $LaMnO_3$, $CaMnO_3$, $LaNiO_3$, $LaCoO_3$, $LaCrO_3$, and the like. Self supporting air electrodes are taught in U.S. Pat. No. 4,751,152 (Zymboly). The usual air electrode material is $LaMnO_3$ doped with Ca or Sr, as a substitute for part of the La. In all cases, the air electrode must be porous, that is, have from 20% to 40% porosity (60% to 80% of theoretical density) in order to be operable in the fuel cell.

U.S. Pat. No. 4,562,124 (Ruka) taught that one difficulty in constructing fuel cells using modified lanthanum manganite air electrodes was, that when the air electrode was modified to have the highest electrical conductivity, it would have a higher coefficient of thermal expansion than some other materials typically used in making the fuel cell, such as those used in the stabilized zirconia electrolyte or the stabilized zirconia support tube. This patent taught a sintered, single phase, solid solution of a compound having the formula:

$$La_{1-x-\omega}(M_L)_x(Ce)_\omega(M_S)_{1-y}(M)_yO_3,$$

where $M_L$=Ca, Sr or Ba; $M_S$=Mn or Cr; and M=Ni, Fe, Co, Ti, Al, In, Sn, Mg, Y, Nb or Ta and where $\omega$ is from about 0.05 to about 0.25, preferably 0.1 to 0.2; and y could be 0. Here, the oxide, carbonates or oxalates of all the metal components including Ce were homogeneously mixed and then sintered, to get the Perovskite-like crystal structure. Preferred compounds were $La_{0.3}Ca_{0.5}Ce_{0.2}MnO_3$ and $La_{0.3}Ca_{0.5}Ce_{0.2}CrO_3$.

It has subsequently been found that the amount of porosity in air electrode tubes made of La-Perovskite based air electrode materials may be difficult to control, where in many cases porosity drops to 10% to 15% due to uncontrolled sintering. What is needed is an air electrode made from a powder composition which will not only satisfy thermal coefficient matching problems, but also solve porosity control problems. It is one of the main objects of this invention to provide such powders.

SUMMARY OF THE INVENTION

Accordingly, the invention resides in a porous ceramic electrode structure characterized in that it consists essentially of the shaped, sintered admixture of: A) doped lanthanum manganite, and B) cerium added in the form of an additive selected from the group consisting of cerium oxide, cerium carbonate, cerium nitrate, cerium acetate, cerium oxalate, and mixtures thereof, where cerium is present in the range of 0.01 mole to 0.045 mole per mole of doped lanthanum manganite.

The sinterability of doped lanthanum manganite, specifically $La_{0.8}Ca_{0.2}MnO_3$, was shown to be sensitive to the (La+Ca)/Mn ratio, or A/B cation ratio, as is common practice to denote the elements that will form oxides with the perovskite-like structure. In practice, however, it is difficult to achieve the same A/B ratio from powder lot-to-lot because of small uncertainties in the assay of the raw materials containing La, Ca, and Mn. This is true for $LaMnO_3$ type materials, and other more common perovskites such as $BaTiO_3$. When cerium (Ce) is added to the $La_{0.8}Ca_{0.2}MnO_3$, preferably to a composition purposely deficient in A-cation by a small amount, this sensitivity to the A/B ratio is eliminated. For example, addition of the rare earth element Y does not eliminate this sensitivity. Dopants for the lanthanum manganite can be elements selected from the group consisting of calcium, strontium, chromium, and mixtures thereof. The preferred porosity of the electrode is from about 20% to 40%.

This ceramic electrode structure is usually in tubular shape and can also have a gas tight solid electrolyte substantially surrounding its outer periphery and a porous outer fuel electrode substantially surrounding the solid electrolyte. Air electrode tubes made from such doped lanthanum manganite powder and rare earth containing additive powder have maintained porosity over 20% through a sintering step in air at 1,500° C. for 5 hours.

BRIEF DESCRIPTION OF THE DRAWINGS

In order that the invention can be more clearly understood, convenient embodiments thereof will now be described, by way of example, with reference to the accompanying drawings, in which.

DESCRIPTION OF THE PREFERRED EMBODIMENTS

Figure 1:
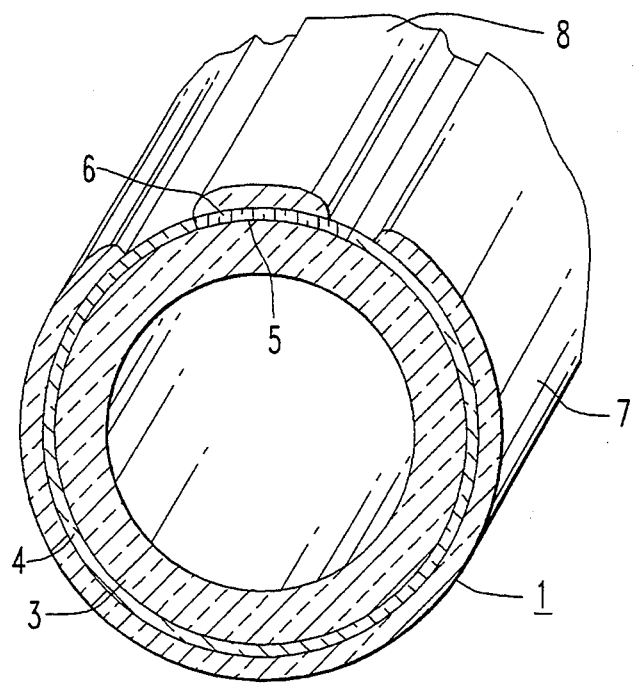
FIG. 1, which best shows the invention, is a schematic view in section of a fuel cell containing the sintered air electrode material of this invention.

Referring now to FIG. 1, fuel cell 1 is shown. Porous, self supporting air electrode or cathode is shown as 3. The cathode 3 is typically 1 millimeter to 3 millimeters thick and can be extruded or isostatically pressed to shape and then sintered. Over the air electrode a gastight, dense, solid electrolyte 4, typically yttria stabilized zirconia, about 1 micrometer to about 100 micrometers thick, is deposited.

A selected longitudinal segment 5 is masked during deposition of the electrolyte, which occurs after an interconnect material 6 is deposited on segment 5. The interconnect material 6 must be electronically conductive in both an oxygen and fuel environment. The interconnect is about 5 micrometers to about 100 micrometers thick and is typically made of dense lanthanum chromite doped with calcium, strontium, or magnesium. Surrounding the remainder of the cell except for the interconnect area is a fuel electrode 7 which functions as the anode. A typical anode is made of a metal ceramic (cermet) material and is about 30 micrometers to 100 micrometers thick. A material 8, which is of the same composition as the anode, can also be deposited over the interconnect 6. This material is typically nickel, or nickel zirconia cermet and is about 50 micrometers to 100 micrometers thick.

In operation, a gaseous fuel, such as hydrogen or carbon monoxide, is directed over the outside of the cell, and a source of oxygen passes through the inside of the cell. The oxygen source forms oxygen ions at the air electrode-electrolyte interface, which migrate through the electrolyte material to the anode while electrons are collected at the cathode, thus generating a flow of electrical current in an external load circuit. A plurality of similar cells can be electrically connected by contact between the interconnect of one cell and the anode of another cell.

The porous ceramic air electrode remains exposed to the oxidant gas atmosphere, usually air, during generator operation, and oxygen reduction takes place at the interface of the air electrode and electrolyte. In the tubular cell configuration, the air electrode maintains intimate contact with the dense electrolyte, and dense interconnection film. Porosity as well as structural stability of the air electrode are important requirements for successful operation of the cell.

The material used to form the air electrode of this invention is a homogenous admixture of doped lanthanum manganite and from 0.01 mole to 0.045 mole, most preferably from 0.02 mole to 0.04 mole, per 1 mole of doped lanthanum manganite, of cerium added in the form of an additive selected from at least one of cerium oxide, cerium carbonate, cerium nitrate, cerium acetate and cerium oxalate.

Usually, a powder of doped lanthanum manganite, for example calcium doped lanthanum manganite, made from individual oxides or carbonates of the metals, is mixed with the additive powder which contains the rare earth metal. The lanthanum manganite powder has particle size diameters of from about 2 micrometers to about 100 micrometers. The cerium containing additive is usually much finer, in the range of from 0.1 micrometer to 2.0 micrometers. The mixture is molded by isostatic pressing, or more usually extruded, using appropriate organic binders such as polyvinyl alcohol, methyl cellulose, starch, and the like, and then sintered in air at from 1,000° C. to 1,750° C., preferably from 1,200° C. to 1,600° C., for from 1 hour to 6 hours. The sintered structure is then cooled, to form a unitary sintered mass having from 20% to 40% porosity.

The form of the air electrode is usually tubular as shown in FIG. 1, or of bulk shape as shown in U.S. Pat. No. 4,751,152, but it can also be in the form of a flat plate or the like. The doped lanthanum manganite has the empirical chemical formula $La_{1-x}(M)_xMnO_3$ (actually $La_{\sim 1-x}(M)_xMnO_3$). In fact, doped lanthanum manganite often has a small excess of oxygen, but the previous formula is used herein for the sake of simplicity. The final material, after sintering, when Ce is used in the additive, has the empirical chemical formula:

$$La_{1-x}(M)_xCe_{0.010-0.045}MnO^3,$$

where M=dopant selected from at least one of Ca, Sr, CR present in a total amount of X=0.2 to 0.4. In these chemical formulas, the amount of La+M may not be exactly 1, but may vary somewhat. It is preferable to have a slight deficiency in La+M, where La+M is approximately 1, that is about 0.960 to 0.995, to prevent formation of hydroxides of La which can occur if La+M is in excess of 1. A typical composition is:

$$La_{0.795}Ca_{0.2}Ce_{0.010-0.045}MnO_3$$

In the above composition, which has a perovskite-like crystal structure as $ABO_3$, where the A cations are the larger La, Ca, Ce and other rare earth metals, and the B cation is the smaller Mn ion of the structure, the ratio of (La+Ca)/Mn should be less than 1. An excess of La and Ca, that is, La+Ca greater than 1 is not desired, since, as oxides, they can react with water to form hydroxides which can decompose during air electrode operation. Use of Ce as a non-hydrolyzable rare earth metal substitute for lanthanum, guards against free lanthanum oxide, and also buffers against excess shrinking due to sintering. By using this additive, very precise measurement and control of La and Ca content is not required. The use of cerium in the additive may allow cerium saturation of the A-site of the crystal structure and some excess may form of a separate phase which is not effected by sintering.

The following Example further illustrates the invention and should not be considered limiting in any way.

EXAMPLE

Lanthanum carbonate, yttrium oxide, $CeO_2$, and calcium carbonate were ultrasonically dispersed in water containing about 0.5% of a dispersant. The amounts used are shown in following Table 1, except for lanthanum carbonate, which is shown in equivalent amounts of lanthanum oxide. Extrusion grade calcium doped lanthanum manganite, having the formula which closely approximates $La_{0.8}Ca_{0.2}MnO_3$, or LCM, was added to each suspension, then the water was evaporated on a hot plate while stirring. The LCM had a particle size distribution of: 10% less than 4 micrometers, 40% less than 7 micrometers, 80% less than 10 micrometers, 100% less than 50 micrometers, with an average specific surface area of 0.635 m²/g. The additive powders had a much finer particle size than the LCM powder, approximately 0.1 to 0.2 micrometer in diameter.

Figure 2:
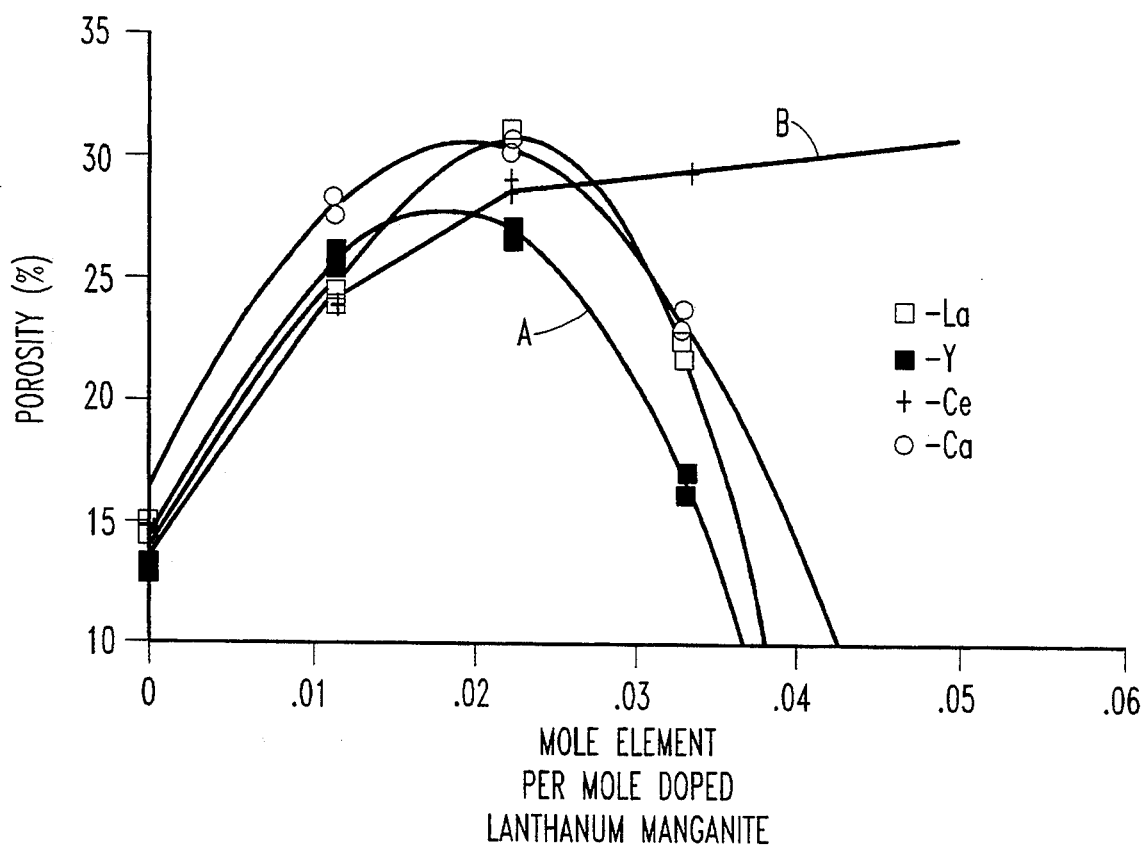
FIG. 2 is a graph of moles of selected elements in doped lanthanum manganite vs. % porosity of sintered, doped lanthanum manganite containing such elements after sintering in air at 1,500° C. for 5 hours.

Pellets ½ inch in diameter were pressed from the dry powders using a pressure of about 705 kg/cm² (10,000 pounds per square inch). Three samples of each formulation were fired at 1,500° C. for 5 hours. Their bulk density was determined from their weights and dimensions, and apparent (open) porosity by the method of Archimedes. FIG. 2, in the drawings shows the results with % porosity measured vertically and mole metal (La, Y, Ce and Ca) measured horizontally.

TABLE 1

| mole metal in additive per mole LCM | Grams $LaCO_3$ per 100 grams LCM | Grams $CeO_2$ per 100 grams LCM | Grams $Y_2O_3$ per 100 grams LCM | Grams $CaCO_3$ per 100 grams LCM |
| --- | --- | --- | --- | --- |
| 0.000 | 0.00 | 0.00 | 0.00 | 0.00 |
| 0.011 | 0.82 | 0.87 | 0.57 | 0.50 |
| 0.022 | 1.64 | 1.73 | 1.14 | 1.01 |
| 0.034 | 2.46 | 2.60 | 1.71 | 1.51 |
| 0.062 |  | 4.83 |  |  |
| 0.125 |  | 9.66 |  |  |

As can be seen from FIG. 2, Y (the black squares=line A) within the range of about 0.01 mole to 0.03 mole per mole LCM provided porosity over 20% in the samples, showing high sensitivity of porosity to the additive. Cerium (the+symbols=line B) provided the desired porosity from about 0.01 mole to 0.045 mole per mole LCM showing much lower overall sensitivity of porosity to cerium containing additive. Cerium thus appears most effective to prevent excess densification and shrinkage due to sintering. Use of Ce over 0.045 mole is thought to possibly effect conductivity and add expense since the curve is relatively flat after 0.03 mole addition. Lanthanum and calcium were also added to show the sensitivity of the A/B cation ratio on sintering. Oxides of these elements are hydrolyzable, and if in excess, can cause failure of the sintered structure. The addition of cerium has been demonstrated to stabilize the sintering behavior of LCM even when the A/B ratio exceeds 1.0.

We claim:

1. A method of making a porous ceramic electrode structure comprising the steps of:
    A) admixing:
        1) lanthanum manganite doped with an element selected from the group consisting of calcium, strontium, chromium, and mixtures thereof, and
        2) cerium additive powder selected from the group consisting of cerium oxide, cerium carbonate, cerium nitrate, cerium acetate, cerium oxalate, and mixtures thereof, where cerium is present in the admixture in the range of from 0.02 mole to 0.04 mole per mole of doped lanthanum manganite;
    B) shaping the admixture into an electrode structure;
    C) sintering the shaped structure in air to form a porous, solid electrode, where the shaped structure maintains a porosity over 20% through the sintering step.

2. The method of claim 1, where the admixture is shaped into a tube in step (B).

3. The method of claim 1, where the additive is cerium oxide.

4. The method of claim 1, where the lanthanum manganite is a powder and has particle size diameters from about 0.2 micrometers to 100 micrometers and the additive has particle size diameters from 0.1 micrometer to 2.0 micrometers.

5. The method of claim 1, where after sintering in step (C), to provide an air electrode of from 20% to 40% porosity, a gas tight solid electrolyte is applied to substantially surround the outer periphery of the air electrode, and then a porous outer fuel electrode is applied to substantially surround the outer periphery of the electrolyte, to form a fuel cell.

6. The method of claim 1, where the cerium additive is effective during sintering in step (C) to prevent excess densification.

7. The method of claim 1, where the electrode structure is shaped by extrusion or isostatic pressing.

8. The method of claim 1, where the doped lanthanum manganite has the formula $La_{1-x}(M)_xMnO_3$, where M is at least one of Ca, Sr, and Cr present in a total amount of $x=0.2$ to $0.4$ and where $La+M$ is approximately between 0.960 and 0.995.

* * * * *